Jan. 27, 1970 P. TRUNINGER 3,491,698
GEAR PUMP

Filed April 9, 1968 2 Sheets-Sheet 1

INVENTOR.
PAUL TRUNINGER
BY Jacobi & Davidson
ATTORNEYS.

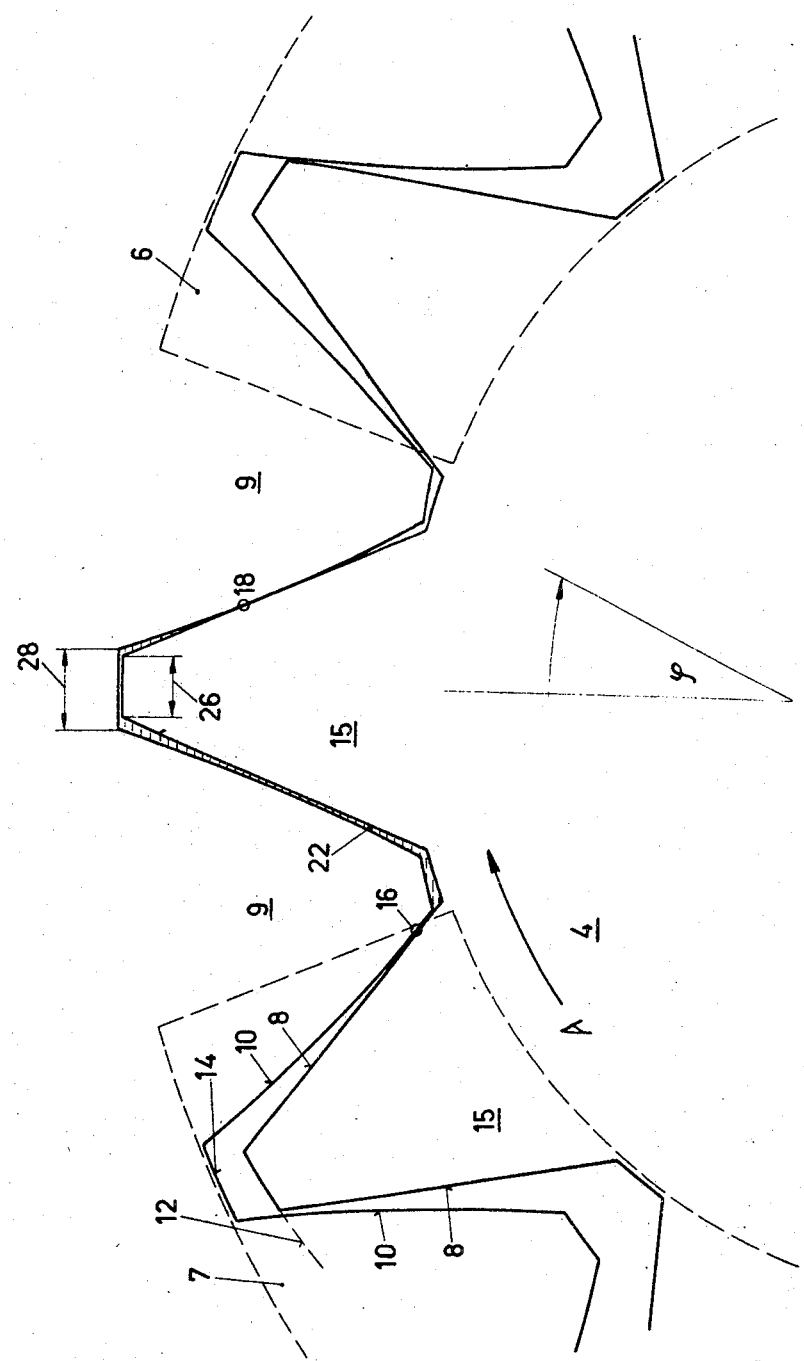

United States Patent Office 3,491,698
Patented Jan. 27, 1970

3,491,698
GEAR PUMP
Paul Truninger, Bellach, Switzerland, assignor to Truninger AG, Solothurn, Switzerland, a corporation of Switzerland
Continuation-in-part of application Ser. No. 616,953, Feb. 17, 1967. This application Apr. 9, 1968, Ser. No. 719,894
Claims priority, application Switzerland, July 1, 1966, 9,573/66; June 26, 1967, 9,154/67
Int. Cl. F04c 1/12
U.S. Cl. 103—126                                     4 Claims

ABSTRACT OF THE DISCLOSURE

An improved gear pump having a novel tooth profile wherein one gear of at least one pair of intermeshing gears is provided with external teeth and the other with internal teeth. The flanks of the teeth of the driving or driven gear are straight, and the width of the tips of the teeth of both the driving and driven gears are within a prescribed range. A crescent-shaped dividing member is placed between the teeth of the driving and driven gears and is constrained to have the same curvature as the addendum circle of the driving gear teeth. The base or bottom land of the teeth of the gear having internal teeth is linearly shaped.

Background of the invention

This application is a continuation-in-part of application Ser. No. 616,953, filed Feb. 17, 1967, now abandoned.

The subject invention generally relates to an improved gear pump in which an externally toothed spur or drive gear intermeshes with an internally toothed outer or driven gear or vice-versa and specifically concerns an improved gear pump of the type described wherein a crescent-shaped dividing member is placed in the contact-free area between the two gears, the two gears being placed eccentrically to one another. The subject invention further pertains to a novel, improved tooth profile for the improved gear pump.

U.S. Patent No. 3,164,099, granted to Itosi Iyoi on Jan. 5, 1965, teaches an external toothed gear pump in which the gear thereof is provided with an involute tooth system. The tooth profile can be selected such that the shape of its top is an arcot circle so that the tooth only comes to bear along a straight line in pressure-tight fashion at the curved inner surface of the housing. In order to improve the sealing action and to reduce wear, the tips or top lands of the teeth can be provided with a surface which is curved toward the addendum circle, and by means of which surface they tightly bear against the curved inner surface of the housing, or in case of internal gear the crescent-shaped member.

Apart from an involute tooth system, there has also been used a cycloidal tooth system. However, such tooth profiles do not take into consideration the specific requirements which are placed upon them by the fluid delivery.

With gear pumps, a small number of teeth are normally used for reasons relating to utilization of the material. However, the use of a small number of teeth results in unfavorable tooth profiles with an involute tooth system, and which can only be improved within certain limits by correcting or offsetting the profile. When standard involute teeth including those with a profile correction are used for gear pumps, a relatively large hollow space results between the tip or top land of the one gear and the base or bottom land of the other gear in which the pumped media such as oil, commonly referred to as "trapped oil" becomes caught and pressed out laterally. This trapped oil can be conducted away by means of so-called trapped oil grooves. Notwithstanding these measures, the hereinafter explained drawbacks still remain.

More precisely, the theoretical maximum possible delivery is not attained. Efficiency is decreased due to the additional losses. The occurring pressure surges bring about an increased bearing load and produce undesired noise. The pronounced curvature of the tooth flanks required by the small number of teeth produces high Herzian compression, and therefore, decreases the longevity of the gears.

In order to prevent these disadvantages, a tooth profile has been proposed in United States Patent No. 3,164,099 granted on Jan. 5, 1965, to Hitosi Iyoi. However, the tooth profile taught and claimed in this patent has the drawback that, because of a small overlap, a helical gearing is required which produces undesired axial components. Since for high pressure relatively small tooth widths are required because of shaft bending, a slant or helical advance equal to the pitch is very large and therefore so are the axial components.

Summary of the invention

Accordingly, a primary object of the present invention is to provide an improved gear pump which obviates the aforementioned drawbacks of the prior art.

Another significant object of the present invention concerns the provision of an improved gear pump which eliminates and prevents trapping of a pumped fluid and excessive loading of the gears.

A further significant object of the present invention relates to the provision of an improved gear pump having an improved tooth profile which ensures proper operation and high efficiency of the pump, and does not result in undue loading of the bearings or noisy operation.

A still further object of the subject invention relates to the provision of an improved gear pump having a long life and providing safe, reliable operation.

Yet another object of the present invention relates to the provision of an improved gear pump which is relatively simple and economical to manufacture.

In order to implement these and still further objects of the invention, which will become more readily apparent as the description proceeds, the invention contemplates that the flanks of the teeth of the driving or driven gear are substantially straight or linear. Further, the inside surface of the crescent-shaped dividing member between the driven and driving gears is constrained to have the same curvature as the addendum circle of the driving gear teeth. Additionally, the base or bottom land of the teeth of the gear having internal teeth is linearly shaped. The above construction is such that the pressure or compression compartment or area between the intermeshing teeth during the engagment or intermeshing phase thereof becomes minimal. The magnitude or size of the compression compartment during the engagement or intermeshing phase undergoes a minimal change throughout the entire area between the suction chamber and the pressure chamber of the gear pump, such change being a function of the angular rotation of this area. Accordingly, quiet running of the gear pump is achieved.

In a preferred embodiment of the subject invention, the widths of the tooth tips or top lands of the driving and driven gear measured at the respective addendum circle diameter, are not smaller than 0.1 modulus and not larger than 0.8 modulus. The term modulus, as employed herein, is represented by the letter $m$ and is equal to the pitch $t$ of the pump gears (the distance between a point on a gear tooth and a corresponding point on the next tooth) divided by $\pi$. The outer or driven gear is contemplated to be constructed such that it exhibits a closed, circular outer bearing surface.

Brief description of the drawings

The invention will be better understood, and objects and advantages other than those set forth above will become apparent, when consideration is given to the following detailed description thereof. Such description makes reference to the annexed drawings wherein.

Description of the preferred embodiment

Figure 1:
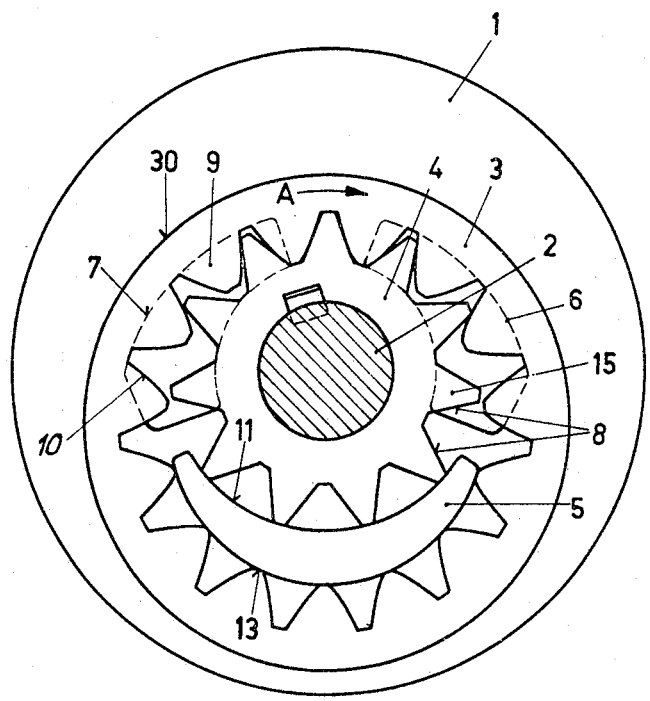
FIGURE 1 is a view into the novel gear pump of the subject invention with the lid thereof being removed; and, FIGURE 2 is an enlarged profile of the gears in the novel gear pump of the subject invention in their area of contact with one another.

Referring now to FIGURE 1, it will be recognized that a shaft member 2 is rotatably mounted in an annular or ring-shaped member or casing 1. In a preferred arrangement, a gear rim 3 provided with internal teeth 9 is rotatably arranged in an eccentric recess of the pump casing 1. A spur gear 4 which is rigidly keyed for rotation with the shaft 2 engages with the teeth 9 of the gear rim 3. The substantially crescent-shaped intermediate compartment between the gear rim 3 and the spur or driving gear 4 is filed with a crescent-shaped member 5. The latter is provided with curved surfaces 11 and 13 against which bear in pressure-tight fashion and in predetermined rotational positions the teeth 9 and 15, respectively, of the outer gear 3 and of the spur or driving gear 4. The crescent-shaped member 5 forms a component of the substantially ring-shaped member or casing 1.

As depicted in FIGURE 2, the straight or linear tooth flank profile 8 of gear teeth 15 generates counter-profiles 10 of teeth 9. These counter-profiles appear in the shape of contour curves of the points of contact of the straight or linear generating profile. The curvature of the tooth flank profile of the gear rim 3 is held small in accordance with the inclination of the tooth flanks 8 of gear 4, and therefore, high Herzian compression is prevented. The line of the crown or top lands of teeth 15 falls within the curvature of the addendum circle 12 of spur gear 4. The profile of the base or bottom land 14 of teeth 9 of the internal gear 3 is delimited by a straight line.

During the intermeshing phase as depicted by the position of the gears in FIGURE 2, the meshing teeth 9 and 15 of both gears 3 and 4 are bearing along two lines of contact depicted by two points 16 and 18. These lines of contact, together with the appropriate portions of the teeth, produce a compression area or compartment 22, the magnitude of which changes in accordance with precise mathematical formulations during the intermeshing phase for a predetermined tooth profile. The selection of the width of the tooth heads 26 and 28 of teeth 15 and 9, respectively, is such that they are not smaller than 0.1 modulus and not larger than 0.8 modulus. In this manner, it is assured that the compression area not only is small, but that the change in its magnitude is as small as possible throughout the intermeshing phase of the gears. This change in magnitude or change in volume $(dV)$ (where the volume here referred to is the volume of the trapped space shown in FIGURE 2 between the points 16 and 18), is, of course, a function of the rotation angle $d\varphi$ (the rotation angle here referred to is that shown in FIGURE 2) and the value of $dV/d\varphi$ is strongly determinative of the noise level of operation of the gear pump. Tests conducted with the improved gear pump of the subject invention have demonstrated that the novel tooth arrangement described creates optimal operational conditions with respect to pressure surges, cavitation, and economy. Further, it has been demonstrated that $dV/d\varphi$ lies within a range of only 0.7% of the delivery volume per tooth pitch or circular pitch. This value is approximately ten times smaller than the values of conventional embodiments of gear pumps which are equipped with involute tooth systems. These comparative values are likewise applicable for pumps having equal diameters of their base and addendum circles of the gear pairs. Furthermore, it has been found that values of $dV/d\varphi$ of up to even 2% produce the advantages referred to herein. On the other hand, values of $dV/d\varphi$ as low as approximately 0.5% can be obtained.

Due to the configuration of the enclosed tooth gear 3, its closed cylindrical outer surface serves as a supporting bearing surface in casing 1. Accordingly, the novel gear pump of the subject invention can be used in high pressure applications without the occurrence of changes in the form or shape of the gear teeth.

As mentioned above, the conducting away of the trapped oil is frequently accomplished by means of so-called "trapped oil grooves." One of such grooves is connected with each of the suction and pressure chambers 6 and 7, respectively. However, these grooves are placed such that they do not come so close together so as to form a direct connection between the suction and pressure chambers via the compression compartment or area between the tooth profiles. Accordingly, the minimal distance of placement of the trapped oil grooves is contemplated to be somewhat larger than one tooth pitch. Naturally, it is similarly possible to conduct away substances other than trapped oil.

The members 1, 3 and 4 can form a stage of a multistage pump. With a rotation of the pump in the direction of the arrow A, the phantom line regions or zones 6 and 7 form the suction and pressure zones, respectively, as has been previously discussed. During a portion of the intermeshing phase of the gears, very little play between the gears exists whereby the free space for trapped oil is negligibly small between the tips or crown and the base of the gear teeth 9 and 15. In the preferred embodiment of the invention depicted in FIGURE 1, the teeth 9 and 15 each exhibit a surface which is curved toward the periphery of their addendum circle and which bears in pressure-tight fashion at the sides 13 and 11 of the crescent-shaped member 5.

As should now be apparent, the objects initially set forth at the outset of this specification have been successfully achieved.

What is claimed is:

1. A gear pump having an inlet and an outlet angularly spaced with respect to each other; an inner gear provided with external teeth intermeshing with an outer gear provided with internal teeth, said gears being disposed eccentrically in relation to one another and forming a crescent shaped engagement-free section therebetween; a crescent shaped separating member disposed in the engagement-free section between the two gears; the outer gear has a self-enclosed bearing surface; the flanks of the teeth of the inner gear have straight surfaces; the inner surface of the separating member has the same curvature as the addendum circle of the teeth of the inner gear; the bases of the teeth of the outer tooth gear are formed planar and cooperate with the top lands of the teeth of the inner gear to reduce to a minimum the squeeze area that is formed between engaging teeth during the phase of their rotation between the outlet and the inlet of the pump; the profiles of said teeth being such that only minimal change in size of said squeeze area occurs as a result of changes in the angle of rotation of said teeth; such minimum size and minimum change in size of the squeeze area during rotation of said gears effects a silent operation of said pump.

2. A gear pump as defined in claim 1 characterized in that the tooth head widths of the teeth of the driving gear and the driven gear lie between 0.1 modulus and 0.8 modulus.

3. A gear pump as defined in claim 2 characterized in that the tooth head widths lie between 0.45 and 0.55 modulus in such maner that the change in the squeeze area over one tooth division lies below approximately 2% volume of the output volume per tooth division when in the phase of engagement.

4. A gear pump as defined in claim 2 characterized in that the tooth head widths lie between 0.45 and 0.55 modulus in such manner that the change in the squeeze area over one tooth division lies within the range 0.5% to 1% volume of the output volume per tooth division when in the phase of engagement.

References Cited

UNITED STATES PATENTS

| | | | |
|---|---|---|---|
| 1,313,035 | 8/1919 | Williams | 74—462 |
| 1,425,144 | 8/1962 | Schmick | 74—462 |
| 1,902,315 | 3/1933 | Vogt | 103—126 |
| 2,223,070 | 11/1940 | Kleckner | 103—126 |
| 2,875,700 | 3/1959 | Hardy | 103—126 |
| 3,117,527 | 1/1964 | Messmer | 103—126 |

DONLEY J. STOCKING, Primary Examiner

WILBUR J. GOODLIN, Assistant Examiner